(12) United States Patent
Beck

(10) Patent No.: US 8,585,119 B2
(45) Date of Patent: Nov. 19, 2013

(54) ACTUATION DEVICE

(75) Inventor: Christian Beck, Rottingen (DE)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 13/510,334

(22) PCT Filed: Dec. 14, 2010

(86) PCT No.: PCT/US2010/060271
§ 371 (c)(1),
(2), (4) Date: May 17, 2012

(87) PCT Pub. No.: WO2011/081926
PCT Pub. Date: Jul. 7, 2011

(65) Prior Publication Data
US 2012/0222356 A1    Sep. 6, 2012

(30) Foreign Application Priority Data

Dec. 15, 2009   (DE) .......................... 10 2009 060 119

(51) Int. Cl.
*B62D 25/00*   (2006.01)
(52) U.S. Cl.
USPC ...................................... 296/97.22
(58) Field of Classification Search
USPC .............. 296/97.22, 146.1; 292/207, 198, 57; 74/110
See application file for complete search history.

(56) References Cited

U.S. PATENT DOCUMENTS

| 4,225,764 A * | 9/1980 | Buttner ........................ 200/518 |
| 4,948,928 A * | 8/1990 | Willigman .................. 200/38 R |
| 5,178,265 A * | 1/1993 | Sepke ........................... 200/528 |
| 7,185,938 B2 * | 3/2007 | Beck ........................... 296/97.22 |
| 2005/0194810 A1 * | 9/2005 | Beck ........................... 296/97.22 |
| 2010/0045049 A1 | 2/2010 | Persiani et al. |
| 2010/0187837 A1 | 7/2010 | Danner et al. |
| 2011/0174102 A1 | 7/2011 | Beck |
| 2011/0309637 A1 | 12/2011 | Beck |

FOREIGN PATENT DOCUMENTS

| DE | 19650594 A1 | 6/1998 |
| DE | 10148199 A1 | 4/2003 |
| DE | 10304701 A1 | 8/2004 |
| DE | 102006011198 A1 | 9/2007 |

(Continued)

OTHER PUBLICATIONS

International Search Report and Written Opinion for PCT/US2010/060271 mailed Mar. 24, 2011.

*Primary Examiner* — Lori Lyjak
(74) *Attorney, Agent, or Firm* — Lowe Hauptman & Ham, LLP

(57) ABSTRACT

An actuation device including, a housing, a pusher supported in the housing, a spring in the housing, which biases the pusher out of the housing, a ring surrounding the pusher over a part of its axial moving range, at least one groove extending on the outside of the pusher at least in sections helically about the longitudinal axis of the pusher, a first diverting surface on the pusher between the groove and the inner actuation end, at least one locking recess on the pusher in circumferential distance to the at least one first diverting surface and being opened towards the outer actuation end, at least one second diverting surface between the locking recess and the groove, which extends obliquely with regard to the axis of the pusher, and which second diverting surface engages with the at least one projection of the ring under certain conditions.

16 Claims, 4 Drawing Sheets

(56) References Cited

FOREIGN PATENT DOCUMENTS

Figure 1:
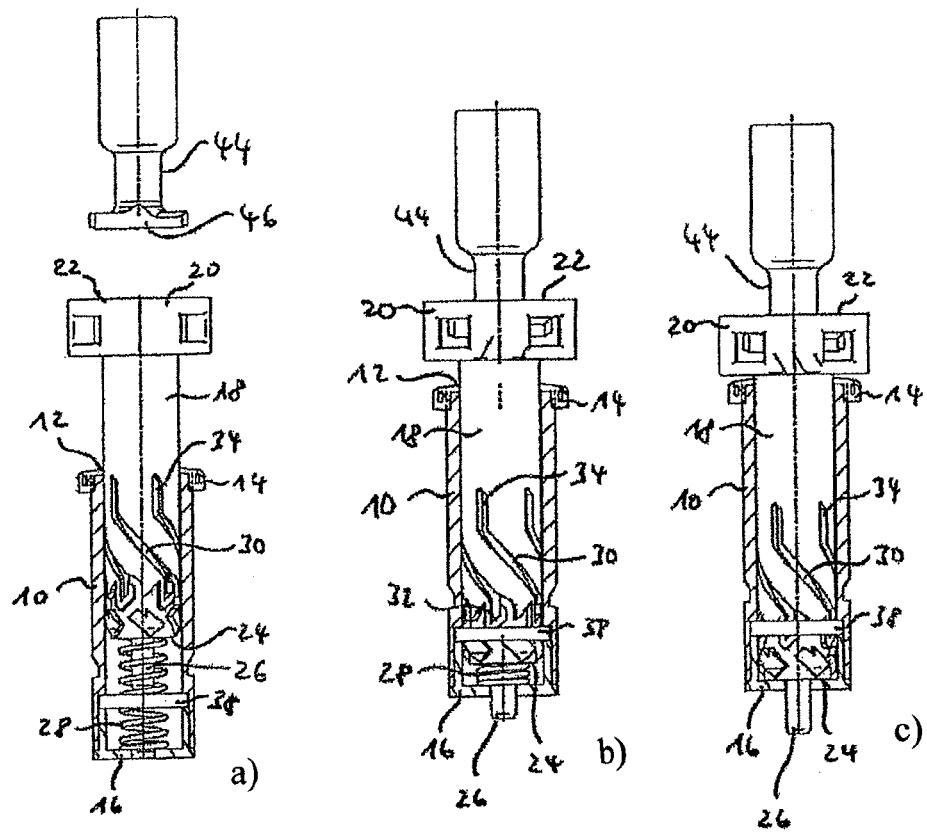

| | | | |
|---|---|---|---|
| DE | 102007011541 A1 | 9/2008 |
| DE | 102008057933 A1 | 7/2010 |
| DE | 102009008496 A1 | 8/2010 |
| EP | 1571029 A2 * | 9/2005 |
| FR | 2889115 A1 | 2/2007 |
| WO | 2008059543 A1 | 5/2008 |

* cited by examiner

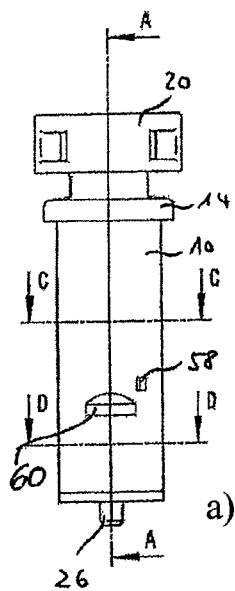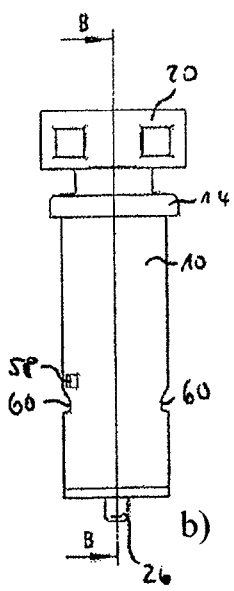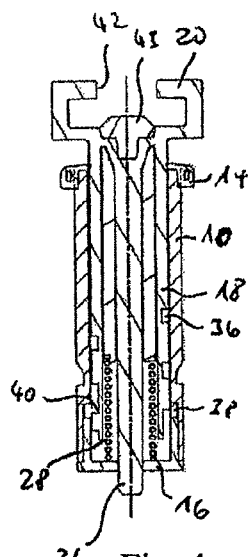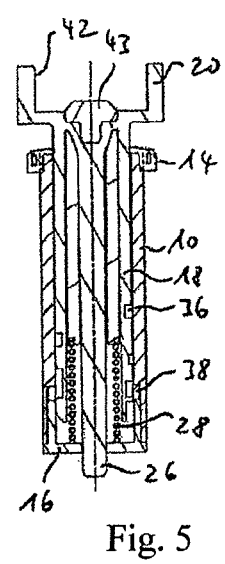
Fig. 3  Fig. 4 A-A  Fig. 5 B-B
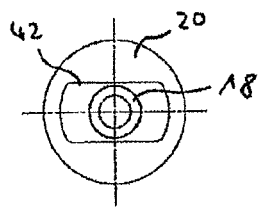
Fig. 6
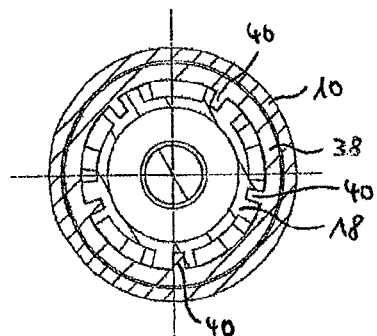
Fig. 7 D-D
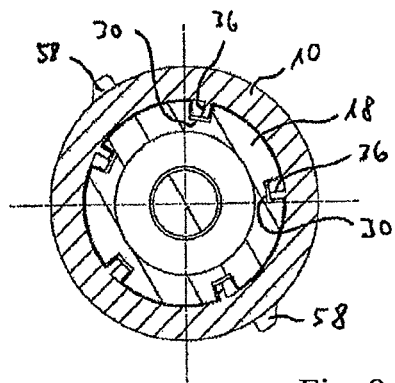
Fig. 8 C-C

ACTUATION DEVICE

RELATED APPLICATIONS

The present application is a national phase of PCT/US2010/060271, filed Dec. 14, 2010 and is based on, and claims priority from, German Application Number 10 2009 060 119.8, filed Dec. 15, 2009.

The invention relates to an actuation device for opening and closing a cover in or on an automobile, with a push-push kinematic which engages with the cover. Actuation devices of this type are used to open and close fuel flaps of automobiles and are known, for instance, from DE 196 50 594 A1. DE 10 2007 011 541 A1 discloses an actuation device in which a control device is disposed beside a locking pin and is kinematically connected to the locking pin. In this way, the overall height is intended to be reduced. However, a complex construction involving a large number of components is disadvantageous. The known device is hence not always sufficiently robust in practice. DE 101 48 199 A1 discloses an actuation device in which a locking pin is supported rotatably about its longitudinal axis in the manner of a bayonet fastening. However, this device too possesses a comparatively complex and non-robust construction. Moreover, there is a need also to provide covers of comparatively small body openings with actuation devices with a push-push kinematic, as are used, for example, in electric vehicles for access to an electrical charging device.

Starting from the illustrative prior art, the object of the invention is to provide an actuation device of the type stated in the introduction, with which actuation device also covers for small body openings, in particular, can be actuated in a constructively simpler and thus more robust and cost-effective manner.

The invention achieves this object by virtue of the subject of claim 1.

Advantageous embodiments are found in the dependent claims, the description and the figures.

The invention achieves the object by virtue of an actuation device for opening and closing a cover in or on an automobile, with a push-push kinematic which engages with the cover, wherein the push-push kinematic comprises the following features:

- a housing, which is suitable for installation in an automobile,
- a pusher supported in the housing such that it is rotatable about its longitudinal axis and axially movable, which pusher comprises an outer actuation end, which during an actuation protrudes via a housing opening out of the housing at least temporarily and engages with the cover, and an inner actuation end being opposite the outer actuation end,
- a spring in the housing, which biases the pusher out of the housing,
- a ring surrounding the pusher over a part of its axial range of movement, which ring is supported in an axially fixed and rotatable manner in the housing and which comprises at least one projection on its inner circumference,
- at least one groove extending on the outside of the pusher at least in sections helically about the longitudinal axis of the pusher, and at least one projection on the inner circumference of the housing, which engages with the groove at least over a wide axial range of movement of the pusher, so that the pusher upon an axial movement in the housing is also rotated about its longitudinal axis,
- a first diverting surface on the pusher between the groove and the inner actuation end and extending obliquely with regard to the axis of the pusher, which diverting surface engages with the at least one projection of the ring and rotates the ring by a predetermined angular amount when the pusher is moved into the housing by a predetermined first stroke,
- at least one locking recess on the pusher at a circumferential distance to the at least one first diverting surface and being open toward the outer actuation end, which locking recess receives the at least one projection of the ring when the pusher is released after the first stroke, whereby the pusher is locked in a locking position after a reverse stroke in the housing, and
- at least one second diverting surface between the locking recess and the groove, which extends obliquely with regard to the axis of the pusher, and which second diverting surface engages with the at least one projection of the ring when the pusher is moved out of the locking position by a second stroke further into the housing, whereby the ring is rotated by a predetermined second angular amount into a rotational position in which the pusher is movable out of the ring into its furthest extended position, wherein the at least one projection of the ring exits through an exit opening at the inner actuation end of the pusher.

According to the invention, a push-push kinematic is combined in a constructively simple manner with a simultaneous rotational movement of the pusher. The pusher can thus be locked or unlocked in the housing in a manner which is known per se for push-push devices. In this case, however, the pusher, in the course of its axial movement, simultaneously performs a rotational movement. This is realized by the at least one helical groove of the pusher and by the engagement of the at least one projection on the inner circumference of the housing into the groove. The first and second diverting surface, together with the locking recess, here form the actual control cam for the push-push locking and unlocking mechanism. This can be in the form, in particular, of a heart-shaped cam. The embodiment and function of this control cam corresponds to the embodiment in the parallel, as yet unpublished German patent application of the Applicant with the official file reference 10 2008 057 933. In contrast to the design which is described there, in the present invention, however, a rotational movement of the pusher is on the one hand effected. On the other hand, the pusher, when it extends into its furthest extended position, moves out of the ring which is held in an axially fixed and rotatable manner in the housing. The ring surrounds the pusher, therefore, only over a part of its axial motional path. As soon as the pusher has left the ring, and hence also the at least one ring projection is no longer in engagement with the control cam of the pusher, the pusher is guided only by the cooperation of the at least one projection on the housing inner circumference and the at least one groove on the pusher.

The actuation device according to the invention is distinguished by a small number of components and hence a robust and cost-effective construction. At the same time, the actuation device is particularly compact, so that it can be fitted from outside into the vehicle opening to be closed off by the cover or removed for servicing. Fitting and servicing is thereby simplified considerably in relation to the prior art, in which, due to the considerable total size, a fitting from the inner side of the vehicle can be necessary. At the same time, the device is also suitable for small covers and vehicle openings. Since exclusively plastics parts can be used for the actuation device, moreover, the endurance limit is able to be improved and the component tolerance made narrower. All parts of the device can be manufactured by injection molding. By contrast, the spring can be a helical spring made of a metal material.

The at least one projection on the inner circumference of the housing can be engaged with the at least one groove over the entire axial motional path of the pusher. The outer actuation end can protrude from the pusher via the housing opening likewise over the entire axial motional path thereof. The first and second diverting surfaces, as well as the locking recess of the control cam, can be formed on radial elevations of the pusher. The at least one locking recess can possess a V-shape or U-shape, for instance, in cross section. The at least one groove of the pusher can be configured between adjacent elevations of the pusher. In a manner which is known per se, a hood made of flexible material, for instance plastic or rubber, which hood covers the pusher outside of the housing and is axially collapsible, can be fitted on the outside of the housing. It can further be provided that the at least one groove, in the fully extended position of the pusher, remains in the housing. An unwanted ingress of water or impurities through the groove is thereby reliably avoided. In order to improve the motional guidance of the pusher, the pusher can comprise five circumferentially equally spaced grooves, first and second diverting surfaces and locking recesses. The housing and the ring can on their inner circumference then likewise each comprise five equally spaced projections. Of course, other numbers for the grooves, first and second diverting surfaces, locking recesses and ring projections are also possible.

According to a further embodiment, the at least one groove, at its end facing toward the outer actuation end of the pusher, can comprise a section extending parallel to the longitudinal axis of the pusher, which section is at least as long as the reverse stroke of the pusher in the housing into its locking position, wherein the at least one projection of the housing is guided in the axis-parallel section of the groove during the reverse stroke. The axial section can, in particular, be at least as long as the distance between the inner actuation end of the pusher and that point of the second diverting surface which is furthest distanced from the inner actuation end. The at least one housing projection is thus aligned to the pusher in the axial direction such that the housing projection is guided straight in the axial section of the groove when the at least one projection of the ring is located within the control cam for the push-push kinematic. With this embodiment, the pusher is guaranteed not to be twisted while the ring passes through the control cam.

On its side facing away from the housing opening, the housing can comprise a cover section. The ring can then be received in an inner ring recess on the cover section. Such a cover section can be formed, for instance, integrally with the housing. It can also however be in the form of a separate part, which is positively connected, for instance, to the housing. Of course, the cover could also, for instance, be latched, bonded or welded to the housing. The ring can be held between the housing and the cover part. The spring which moves the pusher into its furthest extended position in the event of an unlocking can be supported, on the one hand, on an inner side of the cover section and, on the other hand, on a contact surface of the pusher. The contact surface of the pusher can be constituted, for instance, by its inner actuation end. Furthermore, a pin guided through the cover section can be provided on the pusher, with which pin a control device is controllable. The pin can be connected integrally, for instance, to the pusher. The control device can send control signals to onboard electronics of an automobile provided with the actuation device. For instance, in the closed position of the cover and hence the retracted position of the pusher, the pin can close a contact which opens in accordance with an extension of the pusher and hence an opening of the cover. In this way, a check is possible to establish whether the cover is properly closed. It is also conceivable, via such a pin, to effect a locking of the pusher within a central locking system of an automobile. To this end, the pin can engage a corresponding solenoid actuator, for instance.

According to a further embodiment, the pusher can comprise a lateral opening, which in the locking position of the pusher aligns with a corresponding lateral opening of the housing, wherein a closing pin is guidable from the outside through the lateral opening of the housing into the lateral opening of the pusher, so that the pusher cannot be moved out of its locking position. Such a closing pin can be part of a central locking system of an automobile provided with the device. If the vehicle is locked, the closing pin guided through the corresponding openings of the housing and of the pusher also locks the cover, by blocking a movement of the pusher in the housing. If the vehicle, on the other hand, is opened, the closing pin can be withdrawn at least from the opening of the pusher, so that the pusher is movable in the axial direction in the housing.

According to a further embodiment, it can be provided that the housing comprises at least in sections a hollow cylindrical basic form, and that the pusher comprises at least in sections a cylindrical basic form, wherein the housing on its outer circumference comprises at least one locking projection and at least one locking recess arranged offset with regard to the locking projection in the axial and/or circumferential direction. With this embodiment, the actuation device can be fitted in a body opening in a particularly simple manner. To this end, at least one guide element, in particular at least one guide groove, provided in the lead-in direction of the actuation device, can be provided on the body opening, wherein the at least one locking projection of the actuation device and the at least one guide groove of the component, when the actuation device is introduced into the opening, engage in such a way that the actuation device, in at least one predetermined rotational position, is insertable into the opening. Furthermore, emanating from the body opening in the lead-in direction of the actuation device, a locking projection can be provided, wherein the locking projection of the body opening and the locking recess of the actuation device interlock when the actuation device in the predetermined rotational position is fully inserted in the body opening, so that the actuation device is locked in place in the body opening. By rotation of the actuation device out of the predetermined rotational position, the locking mechanism can then be released again, whereupon the body opening resiliently yields for a brief moment. The fitting and removal of the actuation device is simplified considerably by this embodiment. In particular, a non-destructive removal is also possible. This embodiment substantially corresponds to the embodiment in the parallel, as yet unpublished German patent application of the Applicant with the official file reference 10 2009 008 496.

As protection against the ingress of dust, liquid, such as water, or other impurities, on the housing opening and/or between the rim of the cover and the rim of the opening of an automobile which is to be optionally opened or closed by the cover, a surrounding seal can be provided. Such a seal can be, for instance, a plastics seal.

The at least one groove can further comprise on its end facing away from the outer actuation end of the pusher a locking receptacle, which is open toward the outer actuation end of the pusher and in which the at least one projection of the housing is received in the furthest extended position of the pusher. This locking receptacle ensures that the housing projection, when the pusher is fully extended, cannot lose its engagement with the groove of the pusher. At the same time, the maximum extension position of the pusher is defined by the locking receptacle. The locking receptacle can possess a V-shape or U-shape, for instance, in cross section. It can further be provided that opposite the exit opening of the inner actuation end of the pusher and at a circumferential distance to the second diverting surface at least a first mounting diverting surface is provided, extending obliquely with regard to the axis of the pusher, and that further at a circumferential distance to the first mounting diverting surface a second mounting diverting surface is provided, extending obliquely with regard to the axis of the pusher in the opposite direction and leading into the locking receptacle, so that upon mounting of the pusher in the housing the at least one projection of the housing is guided through the exit opening of the inner actuation end to the first mounting diverting surface, wherein a defined relative rotation between the housing and the pusher in a first rotational direction occurs, and the at least one projection of the housing is guided to the second mounting diverting surface, wherein a defined relative rotation between the housing and the pusher in a second, opposite rotational direction occurs, and the at least one projection of the housing is received in the locking receptacle. The mounting diverting surfaces thus guide the housing projection from the inner actuation end into the locking receptacle, the housing projection being received in the locking receptacle forming the start of the groove. A simple initial fitting (and removal) of the pusher in the housing is thereby enabled, at the same time as which it is ensured that the pusher, during subsequent operation of the device, cannot accidentally come loose from the housing. The first mounting diverting surface can be formed in a particularly simple manner by the first diverting surface of the control cam.

According to a further embodiment, the actuation device according to the invention can comprise a cover being pivotable about a pivot axis running perpendicularly to the longitudinal axis of the pusher, wherein the pusher in the area of its outer actuation end comprises a locking section, which locking section is engageable with a corresponding locking section of the cover, wherein the locking section of the pusher upon a rotational movement of the pusher is rotated relative to the locking section of the cover, so that in the locking position of the pusher the locking section of the cover cannot be released from the locking section of the pusher, and in the furthest extended position of the pusher the locking section of the cover can be released from the locking section of the pusher. The cover is pivotable about the pivot axis between an open and a closed position by means of a suitable hinge arm, for instance. The locking sections can be mutually engaged over the entire axial motional path of the pusher. The locking section of the pusher is here rotatable in relation to the locking section of the cover. A suitable configuration of the locking sections enables these to lock the cover against opening by virtue of their relative rotational position adopted in the locking position of the pusher. If the pusher is then unlocked inward from its locking position by an overpressure and is moved into its farthest extended position by the spring, the locking section of the pusher rotates in relation to the locking section of the cover, wherein in the furthest extended position the locking sections adopt such a rotational position with regard to each other that the cover can be released from the pusher and can be fully swung open by hand, whereupon the locking sections separate. Upon closure of the cover, the locking sections then reengage. In this embodiment, the rotational movement of the pusher is not therefore transmitted to the cover. The rotational movement is instead used only to lock and unlock the locking sections. The locking sections can here be formed by a locking projection, for example a locking hammer, on the one hand and a suitable locking receptacle on the other hand. For instance, the locking projection can be formed on the pusher and the locking receptacle on the cover. A reverse arrangement is also possible, however.

According to an alternative embodiment, the actuation device can comprise a cover being pivotable about the longitudinal axis of the pusher, which cover is fixedly connected to the outer actuation end of the pusher. In this embodiment, the cover is therefore pivotable, in particular, about the longitudinal axis of the pusher. As a result of the fixed connection between pusher and cover, the cover, upon the axial and rotational movement of the pusher, is thus likewise moved axially and rotationally. The rotational movement of the pusher is transmitted to the cover. The pusher and the cover can be connected to each other integrally or otherwise. In this embodiment, advantageously, no hinge arm is therefore necessary. The installation space of the device is thereby reduced further, so that use even in connection with particularly small covers and hence body openings is possible, such as, for instance, in connection with charging openings of electric vehicles. Even in such small openings, a fitting and removal of the device is thus possible from outside.

The angular amount of the rotation of the pusher between its locking position and its fully extended position can be predetermined by a suitable embodiment of the at least one groove of the pusher. For instance, the angular amount can be at least 90° and maximally 180°. If the rotation of the pusher is used only for the locking by the locking sections, without transmission of the rotational movement of the pusher to the cover, an angular amount of 90°, for instance, can suffice. If, on the other hand, the rotation of the pusher is transmitted directly to the cover in order to turn this laterally away from the opening to be closed off, a larger angular amount is desirable in order to clear the opening sufficiently. By way of example, an angular amount ranging from 135° to 180° can be cited.

The cover can be constituted, for instance, by a fuel flap for a fuel tank opening or a cover for an electrical charging opening of an automobile. For the comparatively large fuel flaps for access to a fuel tank, a flap pivotable about a pivot axis running perpendicularly to the longitudinal axis of the pusher is particularly suitable. For the comparatively small covers for charging openings of electric vehicles, which can have a diameter of less than 150 mm, in particular less than 120 mm, the fixed connection of pusher and cover is particularly suitable, wherein the cover is moved axially and rotationally as one with the pusher. In the charging opening, electrical connections, in particular plugs or sockets, can be arranged. Into the vehicle opening provided with the device can be integrated a charging current indicator, for example a light-emitting diode display. For instance, it is conceivable to provide a lighting device in a marginal boundary of the opening to be closed off by the cover. It is also possible for the cover to be constituted by an emblem or logo of an automobile manufacturer. This is conceivable, in particular, in respect of covers for electrical charging openings.

Figure 9:
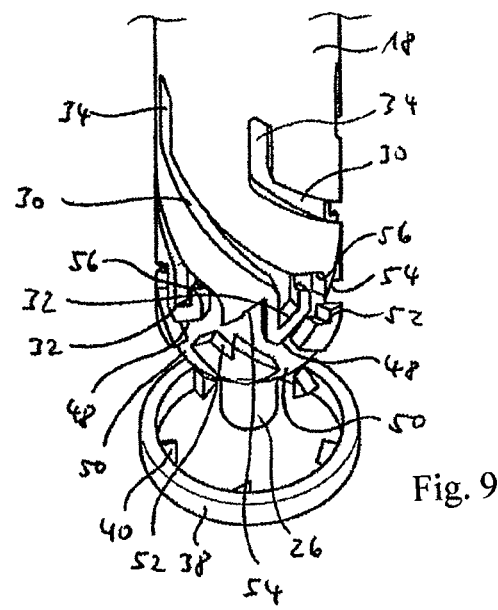
Figure 10:
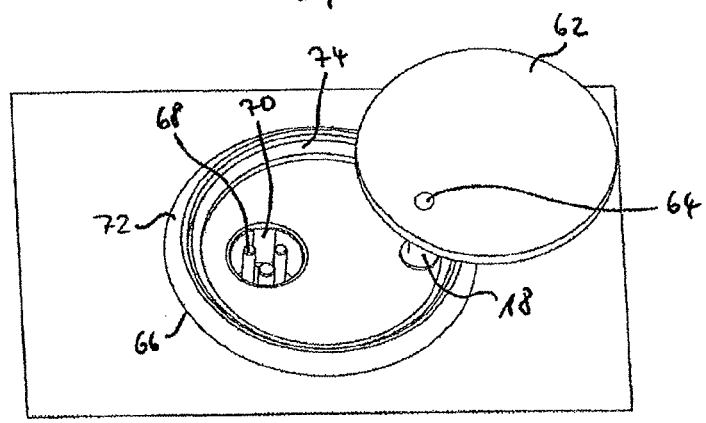
Figure 11:
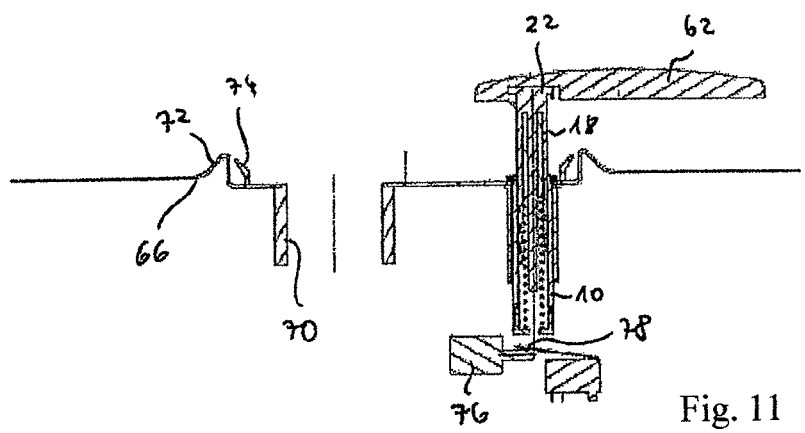
Figure 12:
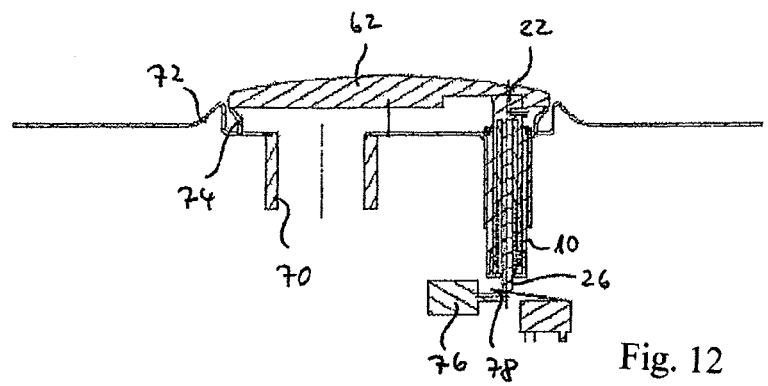
Figure 13:
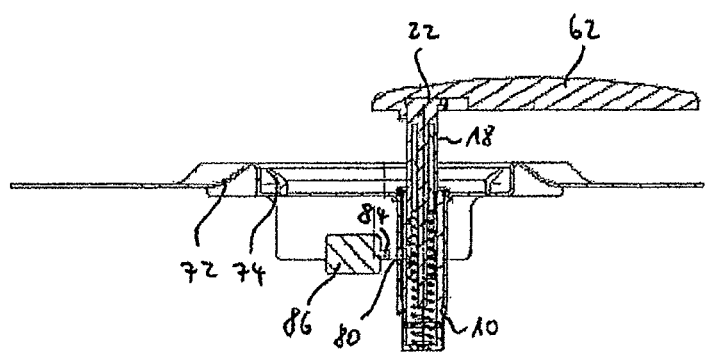
Figure 14:
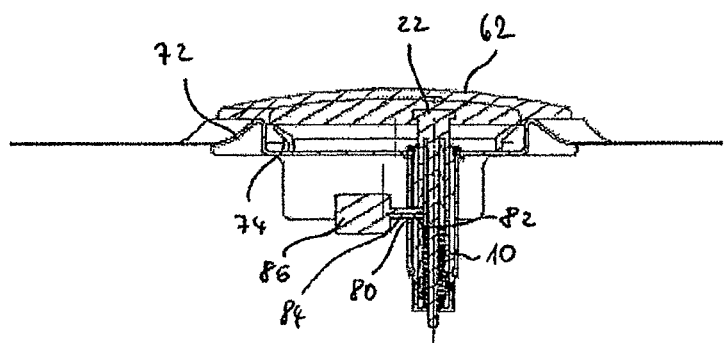

An illustrative embodiment of the invention is explained in greater detail below with reference to figures, wherein, in schematic representation:

FIGS. 1a-c show an actuation device according to the invention according to a first illustrative embodiment in a partially sectioned view in three operating states, FIGS. 2a-c show the actuation device from FIG. 1 partially and in a perspective view in three operating states, FIGS. 3a, 3b show the device from FIG. 1a in two side views, FIG. 4 shows a section along the line A-A in FIG. 3a, FIG. 5 shows a section along the line B-B in FIG. 3b, FIG. 6 shows a top view of the device from FIG. 3a, FIG. 7 shows a section along the line D-D in FIG. 3a, FIG. 8 shows a section along the line C-C in FIG. 3a, FIG. 9 shows an enlarged perspective detail of a device according to the invention, FIG. 10 shows a perspective view of an actuation device according to the invention according to a further illustrative embodiment, FIGS. 11, 12 show a device according to FIG. 10 in a sectional view in two operating positions, FIGS. 13, 14 show a device according to FIG. 10 in a sectional view in two operating positions according to a further illustrative embodiment.

Unless otherwise stated, in the figures the same reference symbols denote the same items. In FIGS. 1a to 1c, an actuation device according to the invention is represented in three operating states. The device comprises a housing 10 which is hollow cylindrical in its basic form, which housing can be inserted into a suitable opening of an automobile. On its top side, the housing 10 possesses a housing opening 12, which is provided with a surrounding plastics seal 14. That side of the housing 10 which lies opposite the opening 12 is closed off by a cover part 16, which is inserted positively into the housing 10. In the housing 10, a substantially cylindrical pusher 18 is arranged such that it is supported in an axially movable and rotatable manner. The pusher 18 possesses an outer actuation end 22 provided with a locking section 20, and an inner actuation end 24 lying opposite the outer actuation end 22. Extending downward from the inner actuation end 24 in the figures is a pin 26 integrally molded to the pusher 18. Supported between the inner side of the cover part 16 and a suitable contact surface of the pusher 18 is a cylindrical helical spring 28. This biases the pusher 18 into its position extended from the housing 10. In the represented example, the pusher 18 further comprises five grooves 30, which extend at equal circumferential distance apart at least in sections helically about the longitudinal axis of the pusher 18. The grooves 30 each possess at their lower end in the figures a locking receptacle 32, which is open toward the outer actuation end 24 and possesses a U-shape in cross section. At their opposite upper end, the grooves 30 possess a section 34 extending in the axial direction in the pusher. Located on the inner circumference of the housing 10 are five projections 36, which are likewise at an equal circumferential distance apart and correspond to the grooves 30 and which can be seen, for instance, in FIG. 8. In the shown example, the projections 36 are engaged with the grooves 30 over the entire axial range of movement of the pusher 18. In addition, a control ring 38 is supported in an axially fixed and rotatable manner in a ring recess between the housing 10 and the cover part 16. The ring 38 possesses on its inner circumference likewise five projections 40 arranged at an axial circumferential distance apart.

Figure 2:
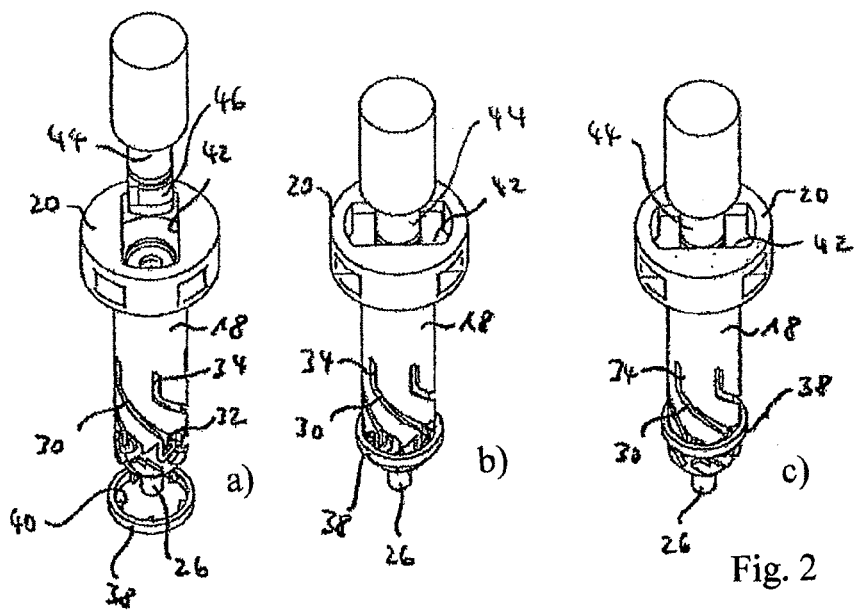

In FIGS. 2a to 2c, for instance, in which, for reasons of clarity, the housing 10 and the cover part 16 are not shown, it can be seen that the locking section 20 of the pusher 18 comprises an elongated opening 42. In FIGS. 1 and 2, a locking section 44 of a cover (not represented in detail) to be actuated by the actuation device, in the represented example a fuel flap of an automobile, is also shown. It can be seen that the locking section 44, at its end facing toward the locking section 20 of the pusher 18, comprises a locking hammer 46, the shape of which is such that the hammer 46 in precisely one rotational position of the pusher 18, namely the rotational position shown in FIGS. 1a and 2a, can be received in the locking section 20 of the pusher 18. If the pusher 18 on the other hand, in the course of its axial movement in the housing 10, is rotated through 90° toward the locking hammer 46 in relation to the position in FIGS. 1a and 2a, as shown in FIGS. 1b and 1c and 2b and 2c, the locking hammer 46 is trapped in the locking section 20. In this state, the cover, upon an axial movement of the pusher 18, is pivoted about a pivot axis running perpendicularly to the longitudinal axis of the pusher 18. It should also be noted that in FIGS. 1a and 2a the device is respectively shown in an open position, wherein the pusher 18 is in its furthest extended position. In FIGS. 1b and 2b on the other hand, the pusher 18, and with it the device, is in a locking position, in which a removal of the locking section 44 from the locking section 20, and hence an opening of the cover, is not possible. In FIGS. 1c and 2c, the pusher 18 on the other hand has been brought by further pressing into the housing 10 into its unlocking position, from which upon subsequent release, actuated by the spring 28, it is movable into the furthest extended position shown in FIGS. 1a and 2a. In this position, the locking section 44 can be removed from the device and hence the cover connected thereto can be swung open.

For the locking and unlocking of the pusher 18, a control cam with push-push kinematic is used, which control cam runs between the lower end of the grooves 30 and the inner actuation end 24 of the pusher 18. It shall be explained in greater detail with reference to the representation in FIG. 9. As already mentioned, the grooves 30 end at their lower end in a locking receptacle 32 of roughly U-shaped cross section. It can additionally be seen that the control cam for the push-push kinematic respectively comprises first diverting surfaces 48 extending obliquely with regard to the longitudinal axis of the pusher 18. These are formed by the bottom side of the locking receptacle 32. Insofar as the pusher 18 is moved out of the position shown in FIG. 9, corresponding to the position in FIGS. 1a and 2a, down into the ring 38, the ring projections 40 make their way through exit openings 50 at the inner actuation end 24 of the pusher 18 into the control cam and into contact with the first diverting surfaces 48. The inner projections 36 of the housing 10 are here guided in the axis-parallel sections 34 of the grooves 30. The pusher 18 is thus not rotatable about its longitudinal axis as long as the projections 40 of the ring 38 are passing through the control cam. As a result of the oblique diverting surfaces 48, the ring 38 is rotated by a defined angular amount, to the right in the figures. If the pusher 18 is then released, the force of the spring 28 gives rise to a reverse stroke of the pusher 18. The projections 40 of the ring 38 make their way into V-shaped locking recesses 52, which are arranged at a circumferential distance to the first diverting surfaces and are open toward the outer actuation end of the pusher 18. In these, the projections 40 are received, so that the pusher 18 is in its locking position and cannot be extended out of the housing 10. This operating position is shown in FIGS. 1b and 2b. If the pusher 18 is pressed out of its operating position further into the housing 10, as shown in FIGS. 1c and 2c, the projections 40 of the ring 38 are guided out of the locking recesses 52 and enter into contact with second diverting surfaces 54 arranged also at a circumferential distance to the locking recesses 52 and aligned likewise obliquely with regard to the longitudinal axis of the pusher 18. The ring is hereupon rotated once again by a defined angular amount, to the right in the figures. If the pusher 18 is then released, the projections 40 of the ring 38, upon the movement of the pusher 18 out of the housing, which movement is effected by the spring 28, make their way out of the pusher 18 through the respectively next exit opening 50

(in terms of circumferential distance) of the inner actuation end 24, so that the pusher can be moved into its furthest extended position. The pusher 18 hereupon distances itself from the ring 38, as shown in FIGS. 1*a* and 2*a*. This function of the push-push kinematic corresponds in principle to the function evident from the parallel German patent application 10 2008 057 933 of the Applicant.

In FIG. 9 it can further be seen that the first diverting surfaces 48 respectively simultaneously form a first mounting diverting surface for the initial fitting of the pusher 18 in the housing 10. Also at a circumferential distance to the first diverting surface 48, there is respectively located above the locking receptacle 32 a second mounting diverting surface 56, which runs in the direction opposite to the mounting diverting surface 48 obliquely with regard to the longitudinal axis of the pusher 18. In the initial fitting of the pusher 18 in the housing 10, the housing projections 36 are guided correspondingly through the exit openings 50 to the first diverting surface 48, from which, under a relative rotation of the pusher 18 with respect to the housing 10, they make their way onward to the second diverting surface 56, from which in turn, under an opposite-running relative rotation between pusher 18 and housing 10, they make their way into the locking receptacle 32. This simplifies the initial fitting (and, where necessary, removal) of the pusher 18 in the housing 10.

In FIGS. 3*a* and 3*b*, it can further be seen that in the represented example the housing 10 comprises on its outer circumference two locking projections 58, which lie opposite one another. These projections 58 can also be seen in FIG. 8. Offset in the axial and circumferential directions with respect to the projections 58, two likewise mutually opposing locking recesses 60 are respectively located on the outside of the housing. With these locking projections 58 and locking recesses 60, a particularly simple fitting and removal of the device in a correspondingly shaped body opening is possible, as is described in the parallel, as yet unpublished German patent application with file reference 10 2009 008 496 of the Applicant. In FIGS. 4 and 5 it can be seen that, on the top side of the pusher 18 and on the base of the opening 42, a buffer stop 43 for the locking hammer 46 is provided.

With reference to FIGS. 10 to 14, a further illustrative embodiment of an actuation device according to the invention shall be described. The function of the pusher 18, and in particular its interaction with the housing 10 and the ring 38, is identical to the device from FIGS. 1 to 9. While in the illustrative embodiment according to FIGS. 1 to 9, however, the rotational movement of the pusher 18 and of its locking section 20 is not transmitted to the fuel flap, but is instead used to lock and unlock the locking sections 20, 44, in the illustrative embodiment according to FIGS. 10 to 14 a cover 62 for a body opening of an automobile is fixedly connected to the outer actuation end 22 of the pusher 18. In contrast to the illustrative embodiment according to FIGS. 1 to 9, in which the fuel flap can be opened and closed, for instance, via a pivot axis running perpendicularly to the longitudinal axis of the pusher 18 and a suitable hinge arm, the cover 62 according to FIGS. 10 to 14 is moved upon a movement of the pusher 18 in the axial direction of the pusher and is simultaneously pivoted about the longitudinal axis of the pusher 18. This pivot axis is illustrated in FIG. 10 with the reference symbol 64. The cover 62 can be constituted by a cover for an access opening 66 in an electric vehicle for the electrical charging of a vehicle battery. To this end, an electric plug 68 can be disposed in the opening 66, as shown, for instance, in FIG. 10. The plug 68 is located in a corresponding recess 70. In the sectional representation in FIGS. 13 and 14, this recess 70 is not shown. The opening 66 is delimited by a surrounding elevation 72. On its inside there is a surrounding dust-protection seal 74 made of plastic. In the state of the cover 62 which is shown in FIGS. 12 and 14, the dust protection seal 74 seals the opening against the ingress of dust, water or other impurities.

Just like the device from FIGS. 1 to 9, the device according to FIGS. 10 to 14 can be unlocked by pressing of the cover 62 and, with it, of the pusher 18, inward out of the locked position shown in FIGS. 12 and 14, so that, upon subsequent release of the cover 62, this, driven by the spring 28, is transported jointly with the pusher 18 upward out of the housing 10, at the same time as the pusher 18 rotates the cover 62 about its longitudinal axis and thus pivots it away from the opening 66. This is shown in FIGS. 10, 11 and 13. If, in this position, a force is again exerted inward upon the rotational axis 64, the pusher 18, and with it the cover 62, is moved back inward and rotated into the locking position shown in FIGS. 12 and 14. In the example shown in FIGS. 10 to 14, the pusher 18, and with it the cover 62, performs a rotation through about 135° between the closed state shown in FIGS. 12 and 14 and the open state of the cover 62 shown in FIGS. 10, 11 and 13. It is also conceivable, however, that the cover 62 and the pusher 18 perform a greater rotation, for instance 180°, in order to clear the opening 66 still further. In the illustrative embodiment according to FIGS. 1 to 9, on the other hand, a rotation of the pusher 18 of about 90° can be sufficient.

In the illustrative embodiment according to FIGS. 11 and 12, moreover, the pin 26 of the pusher 18 engages a control device 76. For instance, the pin 26, in the locked position shown in FIG. 12, can close a contact 78 of the control device 76. The control device 76 can report this closing of the contact 78, and hence the existence of the properly closed position of the cover 62, to on-board electronics of the vehicle. It is also conceivable, however, to configure the contact 78 as a solenoid actuator, so that, by the induction of a magnetic field, the pin 26, and with it the pusher 18, can be held in the locked position shown in FIG. 12. The triggering of the magnetic field can be realized in coordination with a central locking system of the vehicle, so that the cover 62 cannot be opened when the vehicle is locked.

In the illustrative embodiment shown in FIGS. 13 and 14, the housing 10 can possess a lateral opening 80. The pusher can likewise possess a lateral opening 82, which in the locking position of the pusher 18 shown in FIG. 14 aligns with the opening 80 of the housing 10. In this position, a closing pin 84 of a central locking device 86 can move into the openings 80, 82 and thus block the pusher 18, and with it the cover 62, in the locking position against opening, for instance when the vehicle is locked. If the vehicle is opened on the other hand, the central locking device 86 can withdraw the closing pin 84 from the openings 80, 82, as shown in FIG. 13. The pusher 18 can then extend upward.

Those functions of the pin 26 which are described with respect to FIGS. 10 to 14, inclusive of the control device 76 and the contact 78, and the central locking device 86 with closing pin 84 and openings 80, 82, can of course also be provided in the illustrative embodiment according to FIGS. 1 to 9.

The invention claimed is:

1. Actuation device for opening and closing a cover in or on an automobile, with a push-push kinematic, which engages with the cover, wherein the push-push kinematic comprises the following features:
   a housing, which is suitable to be amounted in an automobile,
   a pusher supported in the housing such that the pusher is rotatable about a longitudinal axis of the pusher and such that the pusher is axially moveable, which pusher comprises an outer actuation end, which during an actuation protrudes over a housing opening out of the housing at least temporarily and engages with the cover, and an inner actuation end being opposite the outer actuation end, a spring in the housing, which biases the pusher out of the housing, a ring positioned in the actuation device such that the ring surrounds the pusher over a part of an axial moving range of the pusher, which ring is axially fixed and rotatably supported in the housing and which comprises at least one projection at an inner circumference of the ring, inner at least one groove extending on the outside of the pusher at least in sections helically about the longitudinal axis of the pusher, and at least one projection at the inner circumference of the housing, which engages with the groove at least over a wide axial movement range of the pusher, so that the pusher upon an axial movement in the housing is also rotated about the longitudinal axis of the pusher, a first diverting surface on the pusher between the groove and the inner actuation end and extending obliquely with regard to the axis of the pusher which diverting surface engages with the at least one projection of the ring and rotates the ring about a predetermined angular amount, when the pusher is moved into the housing by a predetermined first stroke, at least one locking recess on the pusher in circumferential distance to the at least one first diverting surface and being opened towards the outer actuation end, which locking recess receives the at least one projection of the ring when the pusher is released after the first stroke, whereby the pusher is locked in a locking position after a reverse stroke in the housing, and at least one second diverting surface between the locking recess and the groove, which extends obliquely with regard to the axis of the pusher, and which second diverting surface engages with the at least one projection of the ring, when the pusher is moved out of the locking position by a second stroke further into the housing, whereby the ring is rotated by a predetermined second angular amount into a rotational position, in which the pusher is moveable out of the ring to a location corresponding to a furthest extended position of the pusher relative to the housing, wherein the at least one projection of the ring exits through an exit opening at the inner actuation end of the pusher.

2. Actuation device according to claim 1, wherein the pusher comprises five grooves provided in the same circumferential distance and extending at least in sections helically about the longitudinal axis of the pusher, first and second diverting surfaces and locking recesses, and the housing and the ring on their inner circumference each comprise five projections provided in the same distance.

3. Actuation device according to claim 1, wherein the pusher comprises a lateral opening, which in the locking position of the pusher aligns with a corresponding lateral opening of the housing, wherein a closing pin is guidable from the outside through the lateral opening of the housing into the lateral opening of the pusher, so that the pusher cannot be moved out of a locking position of the pusher.

4. Actuation device according to claim 1, wherein the housing comprises at least in sections a hollow cylindrical basic form and, in that the pusher comprises at least in sections a cylindrical basic form, wherein an outer circumference of the housing has at least one locking projection and at least one locking recess being distanced with regard to the locking projection in at least one of the axial or circumferential direction.

5. Actuation device according to claim 1, wherein, on the housing opening a surrounding sealing is provided.

6. Actuation device according to claim 1, wherein the at least one groove comprises a locking reception on an end of the groove facing away from the outer actuation end of the pusher and being opened towards the outer actuation end, in which locking reception the at least one projection of the housing is received in the furthest extended position of the pusher.

7. Actuation device according to claim 6, wherein opposite the exit opening of the inner actuation end of the pusher and in circumferential distance to the second diverting surface at least one mounting diverting surface is provided, extending obliquely with regard to the axis of the pusher, and in that further in circumferential distance to the first mounting diverting surface a second mounting diverting surface is provided, extending obliquely with regard to the axis of the pusher in the opposite direction, and leading into the locking reception, so that upon mounting the pusher in the housing the at least one projection of the housing is guided through the exit opening of the inner actuation end to the first mounting diverting surface, wherein a defined relative rotation between the housing and the pusher in a fist rotational direction occurs, and the at least one projection of the housing is guided to the second mounting diverting surface, wherein a defined relative rotation between the housing and the pusher in a second, opposite rotational direction occurs, and the at least one projection of the housing is received in the locking reception.

8. Actuation device according to claim 1, comprising a cover being pivotable about a pivot axis running perpendicularly to the longitudinal axis of the pusher, wherein in an area of the outer actuation end of the pusher, the pusher comprises a locking section, which locking section is engageable with a corresponding locking section of the cover, wherein the locking section of the pusher upon a rotational movement of the pusher is rotated relative to the locking section of the cover, so that in the locking position of the pusher the locking section of the cover cannot be released from the locking section of the pusher, and in the furthest extended position of the pusher the locking section of the cover can be released from the locking section of the pusher.

9. Actuation device according to claim 1, pivotable about the longitudinal axis of the pusher, which cover is fixedly connected to the outer actuation end of the pusher.

10. Actuation device according to claim 1, wherein the cover is a fuel flap for a fuel opening or a cover for an electrical charging opening of an automobile.

11. Actuation device according to claim 1, wherein the at least one groove, at its end facing towards the outer actuation end of the pusher, comprises a section extending parallel to the longitudinal axis of the pusher, which section is at least as long as the reverse stroke of the pusher in the housing into the locking position of the pusher, wherein the at least one projection of the housing is guided in the axis parallel section of the groove during the reverse stroke.

12. Actuation device according to claim 1, wherein the housing comprises a cover section at a side of the housing facing away from the housing opening.

13. Actuation device according to claim 12, wherein the ring is received in an inner ring recess at the cover section.

14. Actuation device according to claim 12, wherein the spring is supported on the one hand side on an inner side of the cover section and on the other hand side on a contact surface of the pusher.

15. Actuation device according to claim 12, wherein a pin being guided through the cover section is provided on the pusher, with which pin a control device is controllable.

16. Actuation device according to claim 1, wherein between the rim of the cover and the rim of an opening of an automobile being optionally opened or closed by the cover, a surrounding sealing is provided.

* * * * *